(12) United States Patent
Mansoorian et al.

(10) Patent No.: US 6,400,824 B1
(45) Date of Patent: *Jun. 4, 2002

(54) SEMICONDUCTOR IMAGING SENSOR WITH ON-CHIP ENCRYPTION

(75) Inventors: Barmak Mansoorian, Los Angeles; Eric R. Fossum, LaCrescenta, both of CA (US)

(73) Assignee: California Institute of Technology, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,027

(22) Filed: Nov. 12, 1997

Related U.S. Application Data (60) Provisional application No. 60/030,647, filed on Nov. 12, 1996.

(51) Int. Cl.[7] ............................. H04L 9/00; H04N 1/44
(52) U.S. Cl. ...................... 380/269; 713/176; 713/189; 380/269; 380/217
(58) Field of Search ............................. 380/10, 29, 52, 380/269, 200, 217; 358/405; 345/157; 250/208; 713/176, 194, 189, 193; 257/292; 348/294

(56) References Cited

U.S. PATENT DOCUMENTS

| | | | |
|---|---|---|---|
| 5,343,297 A | | 8/1994 | Tiemann et al. ............ 348/301 |
| 5,367,516 A | | 11/1994 | Miller ......................... 370/19 |
| 5,406,332 A | | 4/1995 | Shinohara et al. .......... 348/308 |
| 5,461,425 A | * | 10/1995 | Fowler et al. .............. 348/294 |
| 5,499,294 A | | 3/1996 | Friedman ..................... 380/10 |
| 5,502,575 A | * | 3/1996 | Kai et al. .................... 358/405 |
| 5,557,678 A | | 9/1996 | Ganesan ..................... 380/21 |
| 5,576,758 A | | 11/1996 | Arai et al. .................. 348/220 |
| 5,625,210 A | * | 4/1997 | Lee et al. .................... 257/292 |
| 5,751,809 A | * | 5/1998 | Davis et al. .................. 380/23 |
| 5,801,681 A | * | 9/1998 | Sayag ......................... 345/157 |
| 5,835,599 A | * | 11/1998 | Buer ........................... 380/29 |
| 5,841,126 A | * | 11/1998 | Fossum et al. ........... 250/208.1 |
| 5,946,396 A | * | 8/1999 | Davis ......................... 713/178 |
| 5,966,446 A | * | 10/1999 | Davis ......................... 713/178 |

OTHER PUBLICATIONS

Schneier, Bruce. "Applied Cryptography: Protocols, Algorithms, and Source Code in C", 2nd ed. Chapter 10, section 6, p. 226.*

Microsoft Press Computer Dictionary, 2nd ed. Nov. 1993. p. 216.*

* cited by examiner

Primary Examiner—Gilberto Barrón, Jr.
Assistant Examiner—Ho S. Song
(74) Attorney, Agent, or Firm—Fish & Richardson P.C.

(57) ABSTRACT

An imaging device integrating a photosensing array, at least one analog-to-digital converter, and an encryption circuit on a single substrate. An optical image can be directly converted into encrypted digital data prior to transmission the image off the chip.

25 Claims, 5 Drawing Sheets

SEMICONDUCTOR IMAGING SENSOR WITH ON-CHIP ENCRYPTION

PATENT

This application claims the benefit of the U.S. Provisional Application No. 60/030,647, filed on Nov. 12, 1996, which is incorporated herein by reference.

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION

The present invention relates to semiconductor imaging sensors, and more particularly, to semiconductor imaging sensors having on-chip encryption capabilities.

BACKGROUND OF THE INVENTION

Semiconductor imaging sensors have been used in a wide range of imaging applications. Images captured by a sensor can be converted into digital form for imaging processing or storage. Development in data processing and communication devices and systems allows easy and convenient transmission and exchange of digital images or video through various electromagnetic transmission channels (e.g., telephone lines and coaxial cables) and portable storage media (e.g., optical or magnetic disks).

Privacy or security of digital images is desirable in many applications. In particular, exchange and transfer of digital images over a shared transmission channel present a challenge to the security of sensitive information. Internet and Intranet are two examples of such a shared information transmission channel in which many computers are connected with one another by local or wide area communication networks. It is possible for a third party or an intruder to intercept or tamper with an digital image that is transmitted through such a shared transmission channel.

Data encryption techniques have been developed to increase the security or privacy of digital data or images by encoding the data to limit unauthorized access. An encryption technique uses a "key" based on a particular algorithm to change the sequence or format of digital data or images ("plaintext") so that the data or image is enciphered or "scrambled" into an unintelligible form ("ciphertext"). An authorized user recovers the scrambled data or image by using a "key" that is constructed based on the encryption method. However, an unauthorized user, who does not have the knowledge of either the encryption method (e.g., the encryption algorithm) or the key, cannot easily decode the information.

The keys may be a non-rigid type which allows the same encryption and decryption functions to be used with different keys. Rigid type keys are "fixed" into hardware and are desirable in certain types of turn-key systems where data transfer is mostly in one direction (transmission only).

Cryptosystems may be divided into two main categories, symmetrical systems (i.e., the private key systems) and asymmetrical systems (i.e., the public-private key systems). The former is based on functions which may be easily computed but for which it is computationally infeasible to compute the inverse functions. The latter uses a secret key which is shared by the communicants and an eavesdropper has to decipher this secret key among extremely large amount of possibilities.

One well-known symmetrical encryption system is the Data Encryption Standard ("DES") which exploits confusion and diffusion techniques. The number of DES keys can be up to or longer than 512 bits with the current computational power and as short as 64 bits with a security level acceptable to many applications. The DES cryptosystem typically encrypts 64-bit blocks of plaintext using a key length of 56 bits. The fundamental building block in DES (referred to as a round) is a combination of a substitution and a subsequent permutation of the text, based on the key. The plaintext is encoded through 16 rounds of a function, which usually implements substitution, permutation, exclusive-OR ("XOR"), and shift operations on subsets of the text and the key. In each round, a different subset of the elements from the key are used to perform the encryption. Hence, for example, a key $K_1$ may be applied during the first round, and a key $K_i$ is applied during the ith round, etc. An analogous algorithm is used to decrypt the ciphertext, but the keys are now applied in reverse order, and the shift operations are also performed in the opposite direction.

Another cryptosystem is the asymmetric RSA ("Rivest-Shamir-Adleman") Public Key Cryptosystem. See, Rivest et al., "On digital signatures and public-key cryptosystems," Comm. Of the ACM, Vol. 21, pp. 120–126, February, 1978. Two different keys are used: a public key to encrypt the plaintext and a private key to decrypt the ciphertext. Hardware implementations of RSA are usually many orders (e.g., about 1000 to 10,000 times) slower than a respective DES implementation. In software implementations, RSA is generally about 100 times slower than DES. As a result, RSA is often used for secure key exchange without prior exchange of secrets. Digital data or images are encrypted with DES. The encrypted data or images are sent out with the DES key encrypted by using RSA public key encryption.

In addition to encryption, it also desirable in certain applications to ensure the validity of a digital image. Validity of images has been traditionally checked by visual inspection for clues such as internal consistency, documentable provenance, and consistency with existing beliefs. Certain digital manipulation and synthesis of images may be free of observable defects. One way to indicate the originality and validity is to superimpose a digital signature on a digital image prior to transmission or transfer.

Conventional implementations of the above image encryption techniques usually use encryption circuitry separate from the imaging sensor chip. This may compromise the security of the image data since the image data can be intercepted or tampered during transmission from the imaging sensor chip to the off-chip encryption circuitry.

SUMMARY OF THE INVENTION

The present invention integrates one or more analog-to-digital converters and encryption circuity on a focal plane of a semiconductor imaging chip to achieve on-chip encryption and/or superimposition of a digital signature.

A semiconductor imaging device according to one embodiment of the invention includes an imaging array with a plurality of sensing elements formed on a semiconductor substrate, at least one analog-to-digital converter formed on the substrate and electrically connected to the imaging array, and an encryption circuit formed on the substrate. An optical image received by the imaging array is converted to a digital image by the analog-to-digital converter. The encryption circuit encrypts the digital image according to an encryption key to produce an encrypted digital output.

An electronic circuit may also be formed on the substrate to produce a distinct digital number associated with the imaging device. The digital number can be superimposed on the digital image as a digital signature of the device.

These and other aspects and advantages of the present invention will become more apparent in light of the following detailed description, the accompanying drawings, and the claims.

DETAILED DESCRIPTION OF THE INVENTION

Figure 1:
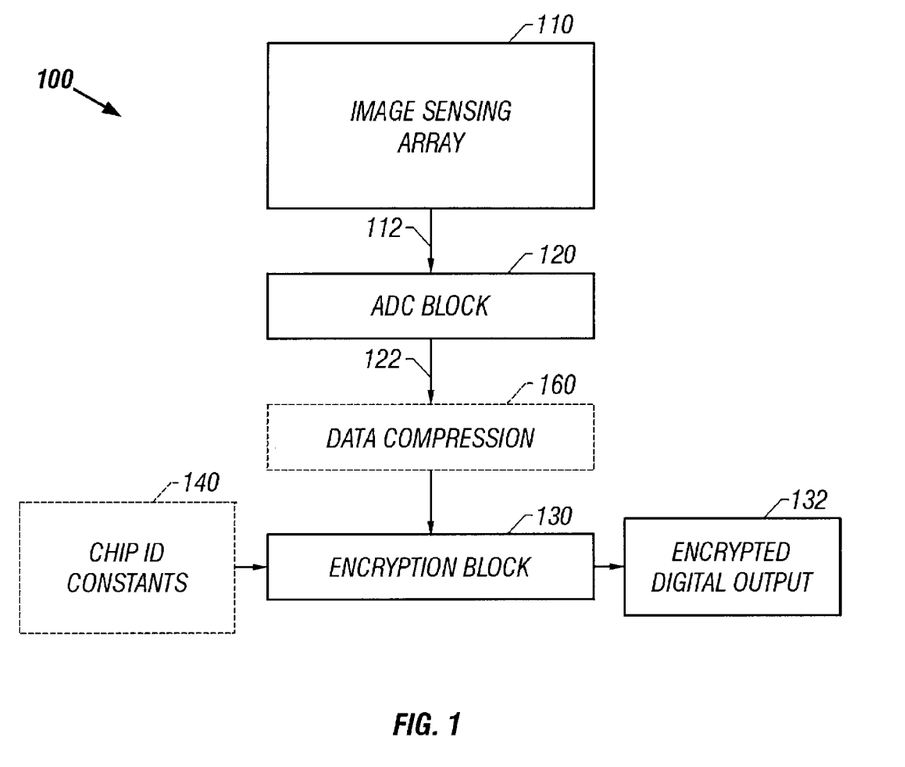
FIG. 1 is a block diagram of one embodiment of the imaging chip of the invention.

FIG. 1 is a block diagram showing one embodiment 100 of the imaging chip of the invention. An image sensing array 110 of multiple sensing pixels formed on a substrate is configured to receive an optical image and generate an electrical analog signal 112 indicative of the image. An analog-to-digital converting circuit block 120 ("ADC block"), which includes one or more analog-to-digital converters and is formed on the same substrate, is connected to the image sensing array 110 to receive the analog signal 112 and convert the analog signal 112 into a digital signal 122. An encryption circuit block 130, also integrated on the same substrate, scrambles the digital image 122 to produce an encrypted digital outport 132 based on an encryption algorithm. In general, the encryption block 130 has electronic elements to form an encoding circuit to perform a specific encryption algorithm such as DES encryption, RSA encryption, digital signature, or any other technique.

The imaging chip 100 of FIG. 1 is an integrated circuit with on-chip analog-to-digital conversion and encryption to directly convert a received optical image into encrypted digital data as its output. To properly retrieve the image from the encrypted output, a user must have the correct key to decrypt the encrypted digital data. This minimizes unauthorized data interception and prevents the forgery of the image.

The imaging chip 100 may also be configured to include an electronic circuit 140 to produce a set of random codes as a unique chip identification number ("chip ID"). Once the chip is manufactured, the chip ID is permanently "burned in" on the chip and cannot be read out or altered. This chip ID is fed to the encryption block 130 and is superimposed on the encrypted output 132 as a distinct digital signature of the imaging chip 100. This chip ID can be used to further verify the validity of an image.

Optionally, an on-chip data compression circuit 160 may be implemented at the output of the ADC block 120 to reduce the actual number of data bits in the output of the chip 100. For a given bandwidth of a transmission line, this data compression can increase the transmission speed. Any digital data compression technique may be used in the circuit 160.

Figure 2:
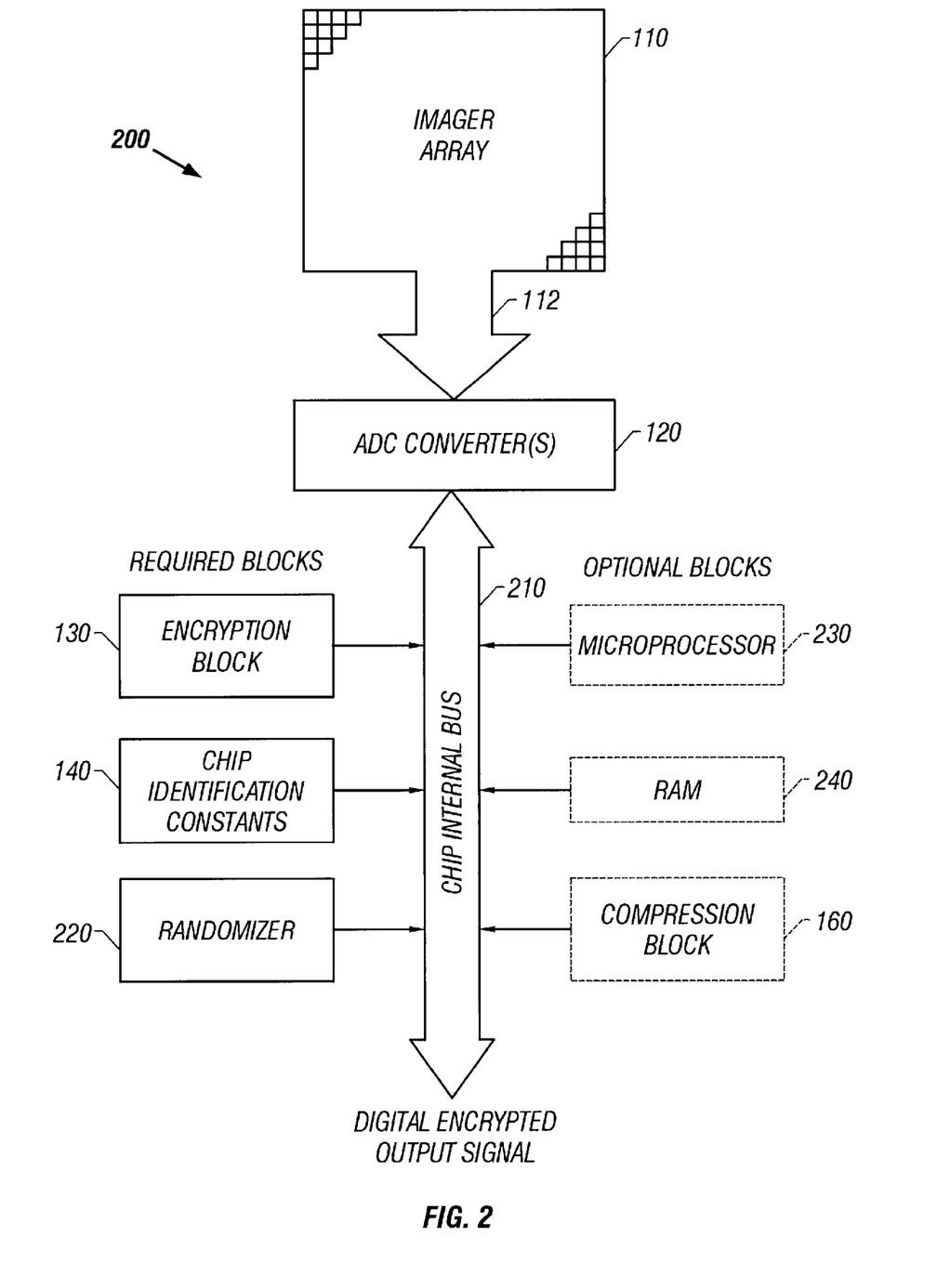
FIG. 2 is a block diagram of another embodiment of the imaging chip of the invention.

FIG. 2 is a block diagram of another embodiment 200 of the imaging chip. An internal bus 210 is built in the imaging chip 200 to provide a communication channel for all the components. A randomizer circuit 220 is used to generate a pseudo random number as a seed for the computation of each encryption so that each encrypted output is unique and different from others. A microprocessor 230 and a random access memory unit 240 may be optionally incorporated in the chip 200 to perform complex computations involved in certain encryption techniques such as RSA encryption.

The pixels in the sensing array 110 used in the above imaging chips 100 and 200 generally may be any photo sensing element such as a photo transistor, a photogate, a photodiode, a CCD detector, a charge injection device or a hybrid focal plane array. A preferred configuration for the sensing pixels is an active pixel sensor ("APS") which includes a light sensing element and one or more active transistors within the pixel itself. The active transistors amplify and buffer the signals generated by the light sensing element in the pixel. The standard CMOS processing can be used to fabricate active pixel sensors so that CMOS signal processing circuits can be easily integrated with an APS imaging array. One type of such APS devices is disclosed in U.S. Pat. No. 5,471,515 to Fossum et al., the disclosure of which is incorporated herein by reference.

The ADC circuit block 120 in FIGS. 1 and 2 which is integrated with the image sensing array 110 on the same substrate can reduce the size, power consumption, and manufacturing and design cost. Such integration also improves the system reliability, noise resistance and chip-to-chip interfacing. Pain and Fossum demonstrated the on-chip analog-to-digital conversion using an active pixel sensor. See, Pain and Fossum, "Approaches and analysis for on-focal-plane analog-to-digital conversion," Infrared Readout Electronics II, Proc. SPIE Vol. 2226, pp. 208–218 (1994), which is incorporated herein by reference.

One or more analog-to-digital converters may be included in the ADC circuit block 120 using different architectures depending on the specific requirements of the applications.

Figure 3A:
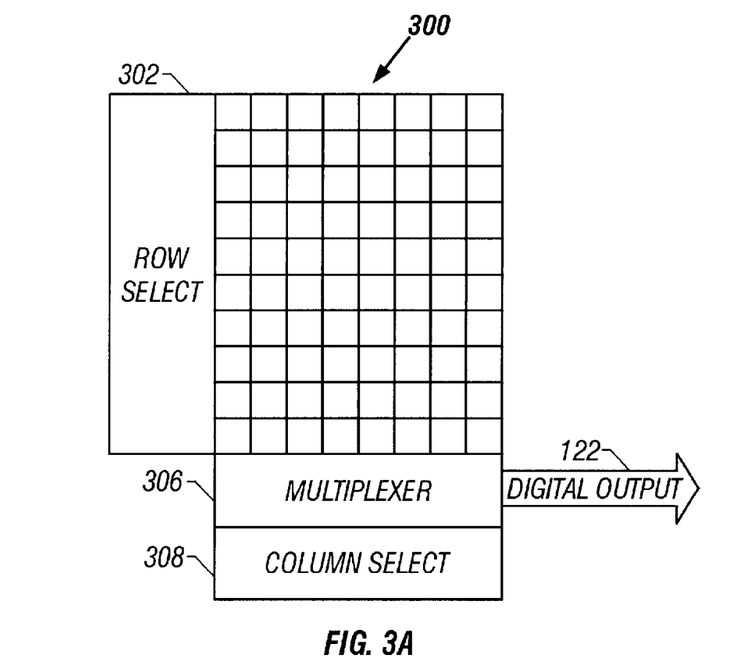
FIGS. 3A, 3B and 3C are diagrams showing exemplary embodiments of integrating an analog-to-digital conversion block to a sensing array.

FIG. 3A shows one architecture of such implementation according to the invention. The sensing array 300 includes a plurality of sensing pixels. Each sensing pixel has a semiconductor photo sensor and an integrated ADC. Thus, an optical stimulus received by each pixel is directly converted into a digital signal and the output of the sensor array 300 is a digital representation of the input image. Two pixel addressing circuits, row select 302 and column select 308, are used to address any one or multiple pixels and fetch data from selected pixels. The digital output 122 is produced at a multiplexer 306.

Figure 3B:
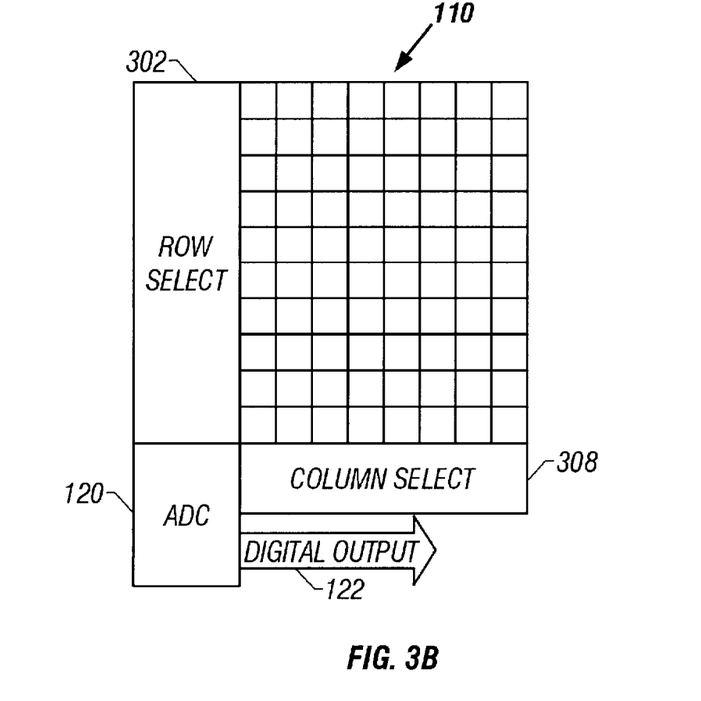

Another architecture integrates a single ADC 120 on the focal plane of the sensing array 110. Referring to FIG. 3B, the analog sensing array 110 converts an input image into an array of analog electrical signals. The ADC 120 that is connected to both the row select 302 and column select 308 converts the analog signals into digital signals according to a sequence determined by the row select 302 and column select 308.

Figure 3C:
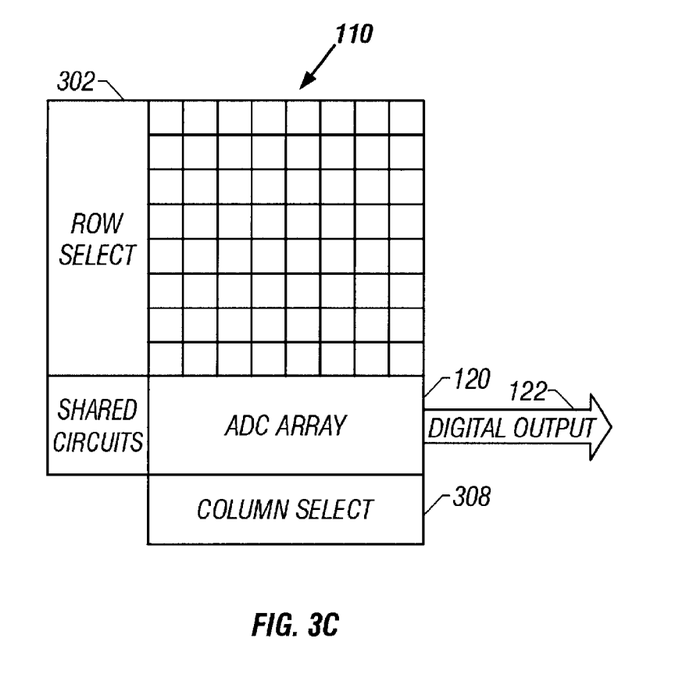

FIG. 3C shows yet another architecture that integrates a one-dimensional ADC array 120 to the analog sensing array 110. Two configurations may be implemented in this architecture. The first configuration uses an ADC array with same number of ADCs as the number of columns in the analog sensing array 110. Each column is designated to one ADC. The second configuration uses an ADC array in which the number of ADCs is less than the number of columns. One ADC is thus connected to two or more columns by multiplexing. In either configuration, all ADCs are in parallel with respect to one another so that each ADC can operate at a lower rate than the single ADC in FIG. 3A.

A focal-plane analog-to-digital converter in a digital imager may eliminate a number of noise sources associated with analog circuits such as cross-talk, clock pickup, power supply noise, electromagnetic interference, and off-chip analog cabling noise. In particular, integration of ADCs in parallel (FIGS. 3A and 3C) can reduce the clock rate at which an integrated ADC operates to achieve the full video frame comparing to analog circuits with an off-chip serial ADC since the serial data rate in the signal chain is typically the highest rate in the entire imaging system which introduces white noise with a maximum bandwidth. The parallel on-chip ADC architecture also alleviated effects of clock noise and other capacitively-coupled noise sources that are known to increase with increasing data rates. In addition, multiple sampling, or over-sampling, of the detector signal can be effectively performed on the focal plane to further increase the signal-to-noise ratio. On-focal-plane ADCs can also lead to a reduction in the total power dissipation in the focal plane array.

Furthermore, digital signals can be digitally processed on-chip as a further level of integration. For example, on-chip digital signal processing can be used for autonomous sensor control, e.g. exposure control, or readout of a selected region-of-interest in the captured image. Image compression can also be achieved on-chip to reduce off-chip drive requirements by using a data compression circuit 160.

In general, any encryption technique may be used to implement the encryption circuit block 130 in the imaging chips 100 and 200 of FIGS. 1 and 2. Examples of suitable encryption algorithms for the encryption circuit block 130 include but are not limited to, the DES method, the RSA factoring method, a discrete exponential method disclosed by Diffie and Hellman in "Privacy and authentication: an introduction to cryptography," Proc. Of IEEE, Vol 67, pp. 397–427, March, 1979, and a method disclosed by Robin in "Digitalized signatures and public-key functions as intractable as factorization," MIT laboratory for Computer Science Technical Report 212, January, 1979. Most of these encryption techniques are based on a set of operations of multiplication and addition of digital data which can be implemented in a CMOS VLSI process.

Figure 4A:
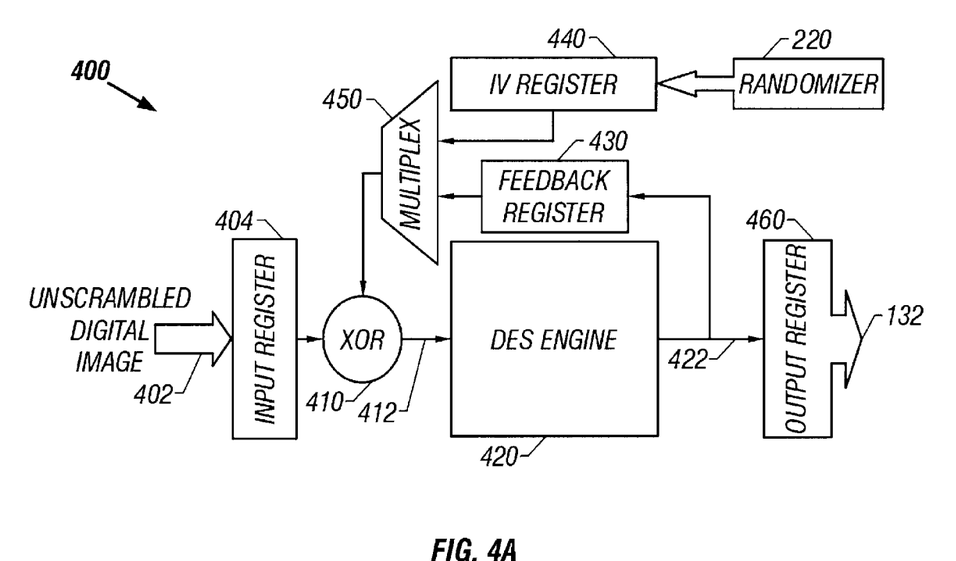
FIG. 4A is a block diagram of one embodiment of the encryption circuit based on the DES encryption technique.

FIG. 4A is a block diagram of one embodiment 400 of the encryption circuit block 130 based on the DES algorithm. This embodiment uses a cipher-block-chaining ("CBC") mode of the DES algorithm to form a feedback mechanism and to improve the security of the DES encryption.

An input register 404 receives and stores an unscrambled input digital image 402 which can be the output 122 from the ADC circuit block 120 or the compressed digital image from the compression circuit block 160. The input data goes through an exclusive-OR gate 410 to enter a DES engine circuit which encrypts the data. The output 422 of the DES engine 420 is then fed back to the XOR gate 410 by mixing with a pseudo random seed number. The feedback loop includes a feedback register 430 for temporarily storing the output data from the DES engine 420, an initialization vector ("IV") register 440 which receives the pseudo random seed number from the randomizer 220, and a data multiplexer 450 which multiplies the outputs of the IV register 440 and the feedback register 430 to produce the feedback data 452. The XOR gate 410 compares the data 452 and the data from the input register 404 to produce its output 412.

The first block of input data (i.e., plaintext) from the input register 404 is directly fed to the DES engine 420 and the respective processed data is stored in the feedback register 430. This first block of data is multiplexed with an initial random number from the IV register 440. Any subsequent plaintext undergoes a XOR operation at the XOR gate 410 with a proceeding block of ciphertext temporarily stored in the feedback register 430 and is directly fed to the XOR gate 410 in the feedback without the initial multiplexing step. This process is repeated sixteen times and the result is sent to a output register 460 as the final ciphertext, i.e., the encrypted image 132.

Figure 4B:
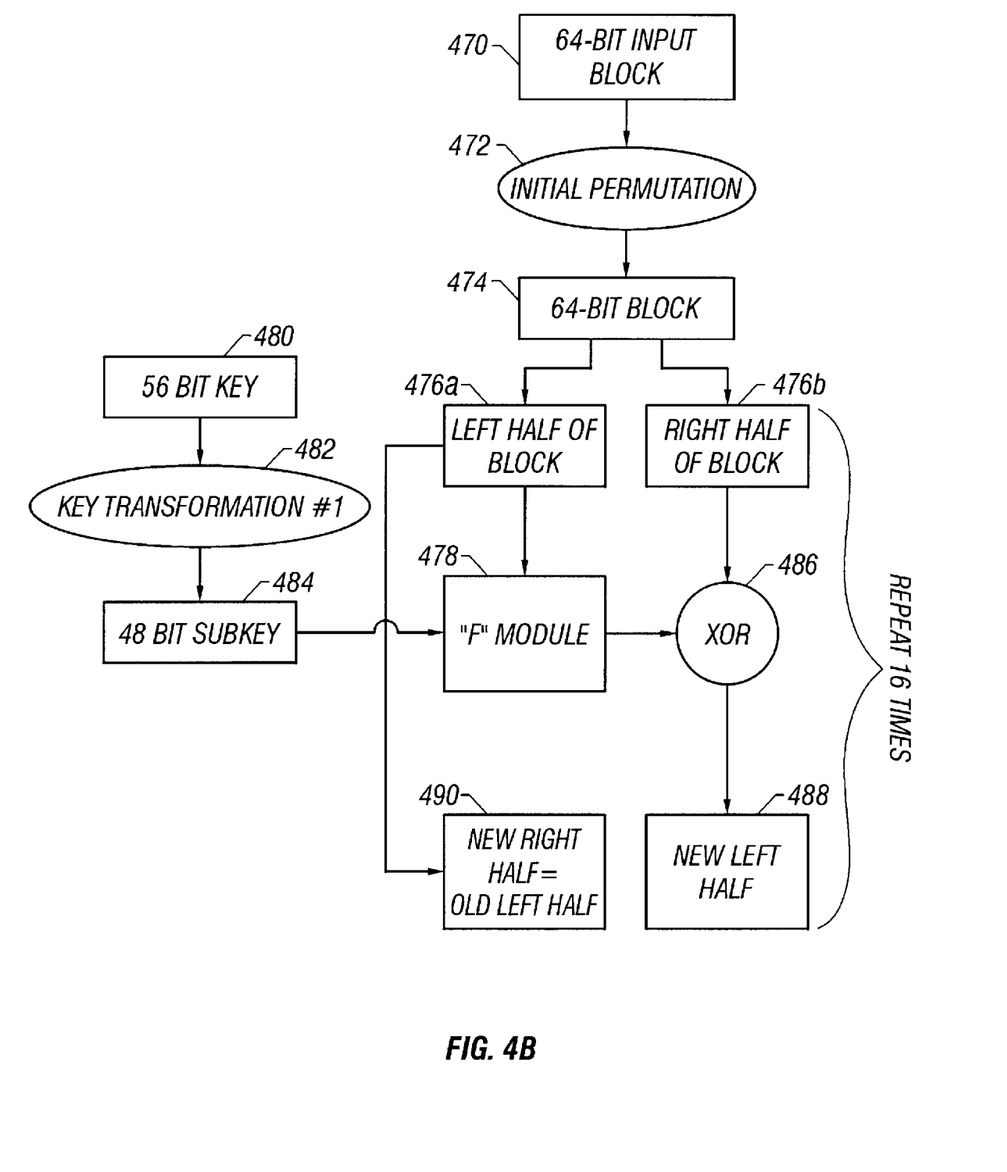
FIG. 4B is a flowchart illustrating operation of the encryption circuit of FIG. 4A.

The operation of the DES encryption circuit 400 is further shown in a flowchart in FIG. 4B. The DES encryption circuit 400 performs two operations, i.e., bit shifting and bit substitution, on the input. The DES key controls exactly how the bit shifting and substitution are performed. By performing the two operations repeatedly in a non-linear manner to achieve a state of nearly total randomness, the DES encryption circuit 400 creates a final encrypted data which cannot be used to easily retrieve the original image without the key.

The DES encryption circuit 400 works on 64 bits of data at a time by using a 56-bit key. At step 470, a block of 64-bit plaintext is read out from the input register (404 of FIG. 4A) and undergoes an initial permutation to form a permuted 64-bit data block (steps 472 and 474). The permuted 64-bit data block is split into two half blocks, a left half block and a right half block at steps 476a and 476b. All operations from steps 472 to 476a and 476b are performed by the DES engine 420 of FIG. 4A. A 56-bit key is transformed in step 482 into a 48-bit subkey which controls transformation and nonlinear substitutions on the left half block at step 478. Next, the output from the feedback loop and the right half block undergo an XOR operation to produce a new left half block and the old left half block is reassigned as a new right half block (steps 488 and 490). This completes one encryption cycle. The DES engine 420 then takes the new left and right half blocks to repeat the above process until a total of sixteen cycles are completed. The resultant ciphertext is then stored in the output register and the next 64-bit block is fetched and encrypted.

Although the present invention has been described in detail with reference to the preferred embodiments, one ordinarily skilled in the art to which this invention pertains will appreciate that various modifications and enhancements may be made without departing from the spirit and scope of the invention as defined by the following claims.

What is claimed is:

1. A semiconductor imaging device, comprising:
   a substrate formed of a semiconductor material;
   a plurality of CMOS image sensing elements, formed on said substrate to construct an imaging array which is responsive to an optical image to produce an analog electrical representation of said optical image;
   at least one analog-to-digital converter formed on said substrate and electrically connected to said imaging array, operating to convert said analog electrical representation into a digital image; and
   an encryption circuit formed on said substrate and configured to encrypt said digital image according to an encryption key.

2. The device as in claim 1, wherein each of said sensing elements includes one of a photogate, a phototransistor, or a photodiode.

3. The device as in claim 1, wherein each of said sensing elements includes an active pixel sensor.

4. The device as in claim 1, wherein said encryption circuit is configured to perform DES encryption.

5. The device as in claim 1, wherein said encryption circuit is configured to perform RSA encryption.

6. A semiconductor imaging device, comprising:

a substrate formed of a semiconductor material;

a plurality of image sensing elements, formed on said substrate to construct an imaging array which is responsive to an optical image to produce an analog electrical representation of said optical image;

at least one analog-to-digital converter formed on said substrate and electrically connected to said imaging array, operating to convert said analog electrical representation into a digital image;

a marking circuit formed on said substrate and configured to produce a unique digital code, wherein said encryption circuit is operable to superimpose said digital code onto said digital image;

an encryption circuit formed on said substrate and configured to encrypt said digital image according to an encryption key and to encrypt both said digital code and said digital image as an encrypted stream.

7. A semiconductor imaging device, comprising:

a substrate formed of a semiconductor material;

a plurality of image sensing elements, formed on said substrate to construct an imaging array which is responsive to an optical image to produce an analog electrical representation of said optical image;

at least one analog-to-digital converter formed on said substrate and electrically connected to said imaging array, operating to convert said analog electrical representation into a digital image;

an encryption circuit formed on said substrate and configured to encrypt said digital image according to an encryption key and to encrypt said digital image as an encrypted stream; and a digital data compression circuit formed on said substrate and electrically connected between said analog-to-digital converter and said encryption circuit, said digital data compression circuit operating to compress a size of said digital image prior to application to said encryption circuit.

8. The device as in claim 7, further comprising a microprocessor formed on said substrate and configured to perform at least part of said encryption of said compressed representation of said digital image.

9. The device as in claim 8, further comprising a memory circuit formed on said substrate and configured to store information for said microprocessor.

10. A semiconductor imaging device, comprising:

an imaging sensing array having a plurality of CMOS sensing elements formed on a substrate and operating to respond to an optical image to produce an analog electrical representation of said optical image;

an analog-to-digital conversion module formed on said substrate and electrically connected to said imaging array, operating to convert said analog electrical representation into a digital image; and an encryption circuit formed on said substrate and configured to encrypt said digital image according to an encryption key.

11. The device as in claim 10, wherein each of said sensing elements includes a CMOS active pixel sensor.

12. The device as in claim 10, wherein said analog-to-digital conversion module includes a single analog-to-digital converter which sequentially converts analog signals from said sensing elements into digital signals.

13. The device as in claim 10, wherein said analog-to-digital conversion module includes a plurality of analog-to-digital converters which a re electrically connected in parallel to one another and simultaneously process analog signals from said sensing elements into digital signals.

14. The device as in claim 10, further comprising a microprocessor formed on said substrate and configured to perform part of said encryption of said digital image.

15. The device as in claim 14, further comprising a memory circuit formed on said substrate and configured to store information for said microprocessor.

16. The device as in claim 10, wherein said encryption circuit is configured to perform the DES encryption and comprises:

an input register receiving digital data of said digital image from said analog-to-digital conversion module;

a logic gate connected to said input register to perform an XOR operation on said digital data according to a feedback digital signal to said logic gate;

a DES processing circuit having an input connected to said logic gate and operating to perform the DES encryption based on said encryption key on said digital data from said logic gate to produce an encrypted output at an output; and a feedback loop interconnecting said output of said DES processing circuit and said logic gate and operating to provide said feedback digital signal.

17. The device as in claim 16, wherein said feedback loop in said encryption circuit further comprises a memory circuit and a digital signal multiplexing circuit that are operable to superimpose a pseudo random number onto a first block of data in said digital image to produce a unique seed for said DES encryption for said optical image.

18. A method for performing image encryption, comprising:

capturing an optical image by using an imaging device having an image sensing array formed on a substrate to produce an analog electronic representation of said optical image;

converting said analog representation into a digital image by using an on-chip analog-to-digital conversion circuit formed on said substrate; and using an on-chip encryption circuit formed on said substrate to encrypt said digital image based on an encryption algorithm so that said imaging device directly sends out an encrypted digital image.

19. The method as in claim 18, wherein said encryption circuit is configured to perform the DES or RSA encryption.

20. The method as in claim 18, further comprising a step of forming a digital signature associated with said digital image by using a unique digital code which is unique to each different chip, and is generated by a circuit formed on said substrate.

21. A method as in claim 18, further comprising, prior to said using, compressing said digital image to form a compressed version of said digital image, and wherein said encryption circuit encrypts said compressed digital image.

22. An encrypted imaging chip, comprising:

a single continuous substrate of silicon;

a CMOS image sensor, formed in said single substrate of silicon;

a digital signal signature production element, which produces a digital signature which is unique to said single substrate of silicon, and which will be different for other substrates of silicon, and which is encrypted and such that a receiver of an image who has an authorized decryption code can determine a source of said image, and such that a receiver without said decryption code cannot determine said source of said image and an image compression element on said chip, and compressing said image prior to encryption.

23. A device as in claim 22, wherein said image sensor is an active pixel sensor.

24. A method of transmitting an image from a first location to a second location, comprising:

forming a semiconductor substrate which includes a unique substrate ID, an image sensor, and an on-chip encryption element, all on said semiconductor substrate;

acquiring an image on said substrate, and associating said image, on said substrate, with said unique substrate ID;

encrypting both said image and said unique substrate ID into an encrypted stream;

sending said encrypted stream to said second location; and at said second location, using a decryption key to decrypt said encrypted stream to determine a source of said encrypted stream from said unique substrate ID.

25. A semiconductor imaging device, comprising:

a substrate formed of a semiconductor material;

a plurality of CMOS image sensing elements, formed on said substrate, to construct an imaging array which is responsive to an optical image, to produce an analog electrical representation of said optical image;

at least one analog-to-digital converter, formed on said substrate, and electrically connected to said imaging array, operating to convert said analog electrical representation into a digital image;

a digital signal signature production element, which produces a digital signature which is unique to said single substrate of silicon, and which will be different for other substrates of silicon;

an encryption circuit formed on said substrate and configured to encrypt said digital image and digital signal signature production element, according to an encryption key and which is encrypted and such that a receiver of an image who has an authorized decryption code can determine a-source of said image from said encrypted digital signature, and such that a receiver without said decryption code cannot determine said source of said image from said encrypted digital signature; and a digital data compression circuit formed on said substrate and electrically connected between said analog-to-digital converter and said encryption circuit, said digital data compression circuit operating to compress a size of said digital image prior to application to said encryption circuit.

* * * * *